(12) United States Patent
Foo-Hurwitz et al.

(10) Patent No.: US 11,337,422 B2
(45) Date of Patent: May 24, 2022

(54) NON-TOXIC LARVICIDE

(71) Applicant: UNM RAINFOREST INNOVATIONS, Albuquerque, NM (US)

(72) Inventors: Ivy Foo-Hurwitz, Albuquerque, NM (US); Ravi Durvasula, Jacksonville Beach, FL (US); Scott Matthews, Amherst, MA (US); Michael Workman, Santa Fe, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 0 days.

(21) Appl. No.: 16/520,847

(22) Filed: Jul. 24, 2019

(65) Prior Publication Data

US 2020/0015477 A1    Jan. 16, 2020

Related U.S. Application Data

(63) Continuation-in-part of application No. 15/567,106, filed as application No. PCT/US2016/028141 on Apr. 18, 2016, now Pat. No. 10,555,519.

(60) Provisional application No. 62/148,774, filed on Apr. 17, 2015, provisional application No. 62/289,394, filed on Feb. 1, 2016, provisional application No. 62/294,174, filed on Feb. 11, 2016, provisional application No. 62/702,807, filed on Jul. 24, 2018, provisional application No. 62/752,512, filed on Oct. 30, 2018.

(51) Int. Cl.
*A01N 25/28* (2006.01)
*A01N 65/28* (2009.01)
*A01N 65/26* (2009.01)
*A01N 65/36* (2009.01)

(52) U.S. Cl.
CPC ............ *A01N 25/28* (2013.01); *A01N 65/28* (2013.01); *A01N 65/36* (2013.01)

(58) Field of Classification Search
None
See application file for complete search history.

(56) References Cited

U.S. PATENT DOCUMENTS

| | | | |
|---|---|---|---|
| 10,555,519 B2 * | 2/2020 | Matthews | A01N 25/28 |
| 2006/0165614 A1 * | 7/2006 | Nelson | A61K 9/5068 424/50 |
| 2008/0166415 A1 * | 7/2008 | Markus | A01N 65/00 424/490 |

FOREIGN PATENT DOCUMENTS

| | | | | |
|---|---|---|---|---|
| CA | 1163496 A1 | * | 3/1984 | |
| KR | 2016009747 | * | 1/2016 | |
| WO | WO-02056709 A1 | * | 7/2002 | ............ A23D 9/007 |
| WO | WO-2007063268 A1 | * | 6/2007 | ............ A01N 31/08 |
| WO | WO-2013113577 A1 | * | 8/2013 | ............ A01N 25/00 |
| WO | WO-2014080199 A2 | * | 5/2014 | ............ A61P 31/04 |

OTHER PUBLICATIONS

Weston(Anal Burning and Peppermint oil) Postgrad. Med. J., vol. 63, No. 742, 717, 1987) (Year: 1987).*
Papathanasopoulos et al.(Effect of Peppermint oil on Gastric Accommodation to a Meal, Compliance and Sensitivity to Balloon Distension in Health, Gastroenterology, 2011, vol. 140 No. 5, Suppl. 1 pp. S811) (Year: 2011).*
Heaney et al.(Real time monitoring of exhaled volatiles using atmospheric pressure chemical ionization on a compact mass spectrometer, Bioanalysis, 2016, vol. 8 No. 13, 1325-1336) (Year: 2016).*
Hebert et al.(Comparison of the toxicity of cinnamaldehyde when administered by microencapsulation in feed or by corn oil gavage, Food and Chemical Toxicology, 1994, 32(12), 1107-15) (Year: 1994).*
Beauchamp et al.(Real time breath gas analysis for pharmacokinetics: monitoring exhaled breath by on line proton-transfer-reaction mass spectrometry after ingestion of eucalyptol-containing capsules; J. of Breath Research, 2010, 4(2)) (Year: 2010).*
Schaffarczyk et al.(Syntheses of chiral 1,8-Cineole metabolites and determination of their enantionmeric composition in Human Urine after ingestion of 1,8-cineole containing capsules, ChemPlusChem, 2013, 78(1), 7785) (Year: 2013).*
Beauchamp et al.(Time-dependent aroma changes in breast milk after oral intake of a pharmacological preparation containing 1,8-cineole, Clinical Nutrition, 2012, 31(5), 682-692) (Year: 2012).*
Pant et al. Encapsulation of neem and karanja oil mixture for synergistic as well as larvicidal activity for mosquito control(Journal of Scientific & Industrial Research (2012), 71(5), 348-352) (Year: 2012).*
Abreu et al.( Chitosan/cashew gum nanogels for essential oil encapsulation; Federal University of Ceara, UFC, Fortaleza, Brazil Carbohydrate Polymers (2012), 89(4), 1277-1282) (Year: 2012).*
Paula et al.(Preparation and characterization of chitosan/cashew gum beads loaded with Lippia sidoides essential oil, Materials Science & Engineering, C: Materials for Biological Applications (2011), 31(2), 173-178) (Year: 2011).*

\* cited by examiner

*Primary Examiner* — Alton N Pryor
(74) *Attorney, Agent, or Firm* — Henry D. Coleman; R. Neil Sudol

(57) ABSTRACT

A larvicide comprising an essential oil encapsulated within a non-viable yeast cell. The larvicide is particularly effective against mosquito larvae, non-toxic to humans and other non-target species, inexpensive to make, and non-toxic during manufacture, transport, and storage.

16 Claims, 8 Drawing Sheets

Chromatogram of MO before and after extraction from stored encapsulated yeast cells

NON-TOXIC LARVICIDE

CROSS-REFERENCE TO RELATED APPLICATIONS

The following application claims is a continuation in part of U.S. patent application Ser. No. 15/567,106, which is a PCT 371 Application claiming benefit to PCT Application No. PCT/US16/28141, which claims benefit of U.S. Provisional Application Nos. 62/148,774, filed Apr. 17, 2015, 62/289,394, filed Feb. 1, 2016, and 62/294,174, filed Feb. 11, 2016, each of which is hereby incorporated by reference in its entirety. The following application also claims benefit of U.S. Provisional Application Nos. 62/702,807 filed Jul. 24, 2018 and 62/752,512 filed Oct. 30, 2018.

BACKGROUND

Various insects are known carriers for pathogens of human and/or non-human disease and/or are linked to the destruction of crops and/or other undesired outcomes. Thus, significant resources are devoted to limiting and/or controlling various "pest" insect populations. For example, mosquitos are known carriers for pathogens of diseases including, but not limited to, malaria (*Anopheles*) Zika virus, dengue virus, yellow fever, (*Aedes*) and West Nile virus (*Culex*). Accordingly, it is very desirable to kill pest insects like mosquitos at the larval stage, before they can spread disease and infection.

Unfortunately, the most commonly used method for limiting and/or controlling undesirable insect populations are pesticides which are often harmful to humans and other non-target species. In the case of mosquitos and other water born pests, many communities resort to adding synthetic pesticides to water reservoirs, including sources of potable water, for mosquito control. The synthetic pesticides used are neurotoxins and growth inhibitors. Their dispersal in the water supply poses a risk to these communities. Furthermore, the manufacture, storage and transport of chemical pesticides all present potential hazards to humans, animals, and/or other non-target species.

Other methods for controlling insect populations, such as the engineering of genetically modified insects are expensive and currently available in only limited areas and only for a specific variety of mosquito (*Aedes*). Furthermore, because it is not always possible to control the movement or migration of an insect population, genetic modification may not be a viable mechanism for populations that are considered pests in a particular region, but which are benign or even beneficial in other regions. Furthermore, because this technology is new and largely untested, it's difficult to predict the long-term consequences and efficacy of releasing genetically modified populations of mosquitos.

Accordingly, novel methods of controlling pest insect populations that are non-toxic to humans, animals, and/or desirable insect populations are thus desirable. However, while non-toxic (to human and other animals) substances such as essential oils have been shown to be effective in killing insect larvae, deployment of essential oils to pest populations is problematic, as large amounts of essential oil would have to be repeatedly added to oviposition sites to achieve significant reduction in the pest population. Furthermore, the dispersed oils would then be vulnerable to degradation by UV radiation and would disrupt the aquatic environment, with the potential for adverse effects on non-target species. Accordingly, an effective mechanism for delivering substances like essential oils directly to the pest larvae population is greatly desired.

It should thus be well understood that because insects are ubiquitous, often prevalent in poor and/or remote communities, and most negatively impact vulnerable populations, methods of controlling pest insects that are inexpensive, easy to manufacture, transport, store, and deploy, would be of great benefit.

SUMMARY

The present disclosure provides a novel insect larvicide that is non-toxic to humans and other non-target species, inexpensive to make, and non-toxic during manufacture, transport, and storage. No harmful waste products are generated during the manufacture of this larvicide and all of its components are generally regarded as safe. Moreover, larvicidal element is effective only when the larvicide is consumed by larvae of the pest insect. The present disclosure also provides method for making and using the novel larvicide.

DETAILED DESCRIPTION

Figure 1:
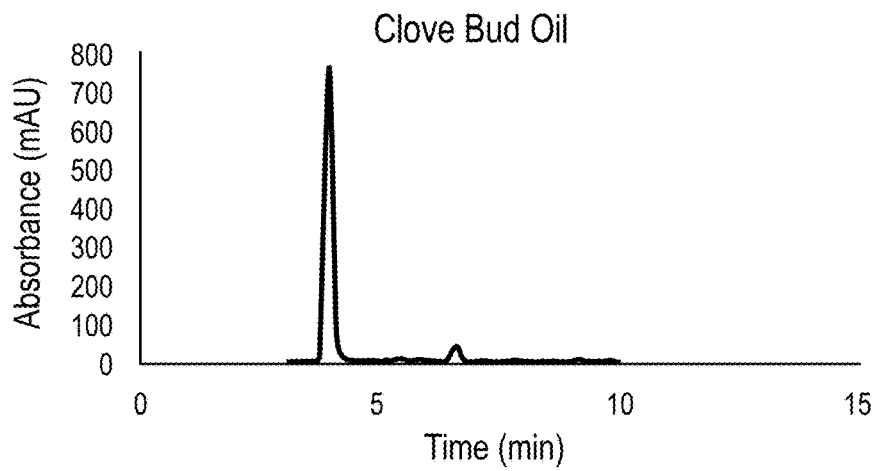
FIG. 1 is a graph showing HPLC analysis of CBO.

The present disclosure provides a novel insect larvicide capsule that is non-toxic to humans and other non-target species, inexpensive to make, and non-toxic during manufacture, transport, and storage. Moreover, according to various embodiments, the larvicidal element is effective only when the capsule is consumed by the target larvae. The present disclosure also provides methods for making and using the novel larvicide.

For the purposes of the present disclosure the target larvae or target species refers to the intended target of the larvicide. While many of the specific embodiments provided herein refer to mosquito larvae as the intended target, it will be understood that larvae of other insects or other species may also be the intended target and that the larvicide may be altered, as described herein, to be more particularly suited towards one target or another. Furthermore, it will be understood that the novel larvicide described herein may be designed to be suitable for more than one target and that references to "a" or "the" target species does not necessarily preclude embodiments wherein there is more than one target species.

According to various embodiments, the novel larvicide capsule comprises a larvicidal element encapsulated in an ingestible delivery vehicle. According to various embodiments, the larvicidal element is a substance that is non-toxic to humans and other non-target species, but which negatively impacts the ability of the target species to behave in an undesirable manner. For example, ingestion of the larvicidal element by the target may result in the immediate or eventual death of the target. Alternatively, ingestion of the larvicidal element by target may result in the larva being unable to transmit a disease vector, sterile, or developmentally hindered in some other way. According to a specific embodiment, the larvicidal element is an essential oil (EO).

Essential oils include terpene components and are naturally produced by plants to provide protection from larvae and adult insects, while being non-toxic to humans. For the purposes of the present disclosure, essential oils are defined as terpene containing oils produced by plants. For more than three decades, essential oils have been recognized as cheap, effective larvicides. Essential oils are thought to exert larvicidal effects through three different mechanisms: neurotoxicity, growth inhibition, and interruption of metabolic pathways. The simultaneous action of these mechanisms retards the evolution of resistance to the larvicide. Examples of essential oils that are suitable for use as larvicidal elements include, but are not necessarily limited to, clove bud oil (CBO), mandarin orange oil (MO), sweet orange oil (OO), basil, peppermint, lavender, neem oils and combinations thereof. Since the composition of essential oils varies, oils may be combined to enhance larvicidal efficacy where the environment or larval physiology provide opportunity. Suitable essential oils can be purchased commercially at low cost or extracted from the plants from which they are derived using standard techniques.

Previous larvicidal compositions have included emulsions formed from mixing an essential oil within a solvent and directly distributing the emulsion to a water source. These larvicidal compositions mechanism for action was via contact killing. For example, the oils would coat the larvae and interfere with breathing, movement, or their ability to obtain oxygen. However, these oils are also then free to act on the environment and non-target species. According to one embodiment, the ingestible delivery vehicle of the present disclosure is designed to encapsulate the larvicidal element so that the larvicidal element is sequestered or segregated from the environment.

For the purposes of the present disclosure the term "ingestible delivery vehicle" is intended to mean an entity capable of encapsulating the larvicidal element and generally sequestering it from the environment until the delivery vehicle is ingested by the target species. The ingestible delivery vehicle is generally non-toxic to non-target species. In general, the ingestible delivery vehicle should be attractive as a food source to the target species and have sufficient durability in the environment in which it will encounter the target species that it can withstand the conditions long enough to be ingested by the target species. For example, many larvae are water-borne and/or find nutrients in aquatic environments thus, in these circumstances the ingestible delivery vehicle should not readily degrade in an aquatic environment. According to some embodiments the ingestible delivery vehicle may be inert to all or most environments that do not replicate the environmental conditions found in the digestive system of the target species. Accordingly, to various embodiments, the ingestible delivery vehicle may be an inactive or non-viable yeast cell. According to a more specific embodiment, the ingestible delivery vehicle is a non-viable yeast cell of the *S. cerevisae* variety. It is a well-documented feature of larval biology that mosquito larvae will preferentially consume and readily digest *S. cerevisae*. In fact, a recommended food for rearing larvae in laboratory settings is *S. cerevisae*. Moreover, the cell membrane of yeast cells is rich in beta-6-glucan, a polysaccharide, and chitin. Larvae have intestinal enzymes specialized for the digestion of beta-6-glucan to obtain chitin and beta glucans and are able to rapidly break down ingested yeast cell membranes. Other suitable ingestible delivery vehicles may include (1) *S. cerevisae* genetically modified for greater essential oil loading and a thicker cell membrane and (2) *S. cerevisae* opsonized with fragments of adult insect exoskeleton, bacteria, corn oil, corn sugar, and other phagostimulant elements of the larval diet.

The larvicidal element may be encapsulated, infused, injected, entrapped, loaded, etc. (referred to herein collectively as "encapsulated" for ease of discussion) into the ingestible delivery vehicle using any suitable method depending on the specific larvicidal element and ingestible delivery vehicle being used. Examples of suitable methods for encapsulating the larvicidal element in the ingestible delivery vehicle include, but are not limited to, a combination of heat and agitation, plasmolyzation, and coacervation.

According to a specific embodiment wherein a larvicidal capsule comprises an essential oil such as orange oil as the larvicidal element and a yeast cell such as an *S. cerevisae* cell as the ingestible delivery vehicle, the orange oil can be encapsulated within the yeast cell via a process using heat and agitation, as described in greater detail in the Examples section below. The heat and agitation method results in the encapsulation of all components of the essential oils without discrimination, including terpenes and aldehydes. However, molecules as large as 400,000 can freely diffuse through the cell wall.

According to a more specific embodiment, encapsulation may start with 20 wt % yeast cells in distilled water. Essential oil equivalent to the total yeast cell volume is added to the cell solution and shaken for 20-24 hours at 40° C. in either a sealed vial or baffled flask, depending on total volume. The solution is removed from the incubator and spun down.

As explained in greater detail below, ensuring complete removal of any residual oil (i.e. larvicidal element) can be highly desirable for specific embodiments, for example, when the presence of the larvicidal element would be harmful to non-target species. Accordingly, in one embodiment, the present disclosure provides a surfactant-based washing step which ensures complete removal of residual oil from the cell surface. The supernatant is decanted, and a surfactant solution is added to wash oil from the exterior of the cells, with careful attention paid to the concentration to minimize the amount of essential oil extracted from within the cells. The surfactant/cell mixture is well mixed then spun down and decanted again.

Suitable surfactants include, for example, Tween 20, Tween 80, Triton X-100 and sodium dodecyl sulfate (SDS) at concentrations ranging from 10-30%. Surfactants are amphipathic compounds with hydrophilic and hydrophobic portions that will locate themselves at the interface between the fluid phase with different degrees of polarity, such as oil and water. In this manner, the excess EOs are removed from the surface of the cells.

After the surfactant-based washing step, the cells can be washed with water to remove any residual surfactant. After the last wash, the water is decanted, and a small volume of water is added to make the cells fluid for transfer to a lyophilizer jar. The cells are lyophilized at P<0.1 mbar for 16-20 hours. The resulting dried solid is broken up with a mortar and pestle before storage into an air-tight container at 4° C.

The process described above uses an excess of oil to ensure maximum encapsulation yield. In practice, and as demonstrated in the Experimental section below, the optimal amount of oil used may differ for different essential oils. It should be noted that optimal EO loading may depend on the intended use. For example, for water-based larvicides, it is desirable to maximize EO loading while maintaining water solubility.

As explained in greater detail in the Experimental section below, HPLC analysis of larvicides formed using the method above demonstrated up to ~11% loading by weight for CO-loaded yeast cells and between 30-40% loading by weight for MO- and OO-loaded yeast cells. Moreover, the composition of the dried larvicide stored at 4° C. was unchanged after 3 months.

Once the essential oil enters the cell, the yeast becomes nonviable and cannot replicate, thereby reducing or eliminating any potential impact on the environment during storage, transportation, and/or use. However, while the yeast cell is nonviable, the cell's thick outer membrane remains intact and thus sequesters the oil from the surrounding environment. In fact, after encapsulation, water/ethanol extraction is the only non-enzymatic laboratory for removing the encapsulated oil. As explained above, some target species, such as mosquito larvae have intestinal enzymes that are specialized for the digestion of beta-7-glucan, thus resulting in a system wherein the lemongrass oil/yeast cell capsule is essentially inert to all environments it is likely to encounter other than the specialized digestive systems of the target mosquito larvae. Furthermore, it should be noted that both yeast and many essential oils are commonly found in food and are entirely harmless to humans.

One of the difficulties in producing effective pesticides is ensuring that the pesticide targets only the desired pest and does not negatively impact unintentional targets or the environment. For example, while cinnamon oil has been demonstrated to be effective at killing mosquito larvae, it is also considered hazardous to the environment. Moreover, the presence of oil itself can be hazardous to the environment. For example, oil can coat the surface of bodies of water acting as a physical barrier and/or contact agent to kill indiscriminately. Even trace residual oil found on the exterior surface of a microcapsule can negatively impact the environment and unintended targets. Furthermore, some essential oils include elements or properties which may act as repellants or deter mosquitos from laying eggs in areas around the pesticides.

Accordingly, it may be desirable to ensure that the microcapsule does not present any residual surface oil so that the only mechanism for exposure to the encapsulated oil is ingestion of the microcapsule. Accordingly, the present disclosure has provided a surfactant-based washing step which ensures removal off all residual oil from the surface of the microcapsule. It should be noted that inclusion of this washing step may enable the use of oils that have previously considered unusable as pesticides, such as cinnamon oil, due to their toxicity to the environment or those, like citronella, which may also include repellant characteristics.

As another example, it may be desirable to kill *Culex* larvae but not *Aedes* larvae. Previous trials have demonstrated that CBO, cinnamon leaf oil, Australian white cypress oil, thyme oil and lemongrass oil are all effective at killing both *Aedes* and *Culex* larvae. However, multiple trials utilizing the above-identified essential oils encapsulated and washed using the surfactant-based washing step described above were shown to be ineffective against *Aedes* larvae at concentrations of up to 250 mg·L encapsulated cells (30-75 mg/L EO, depending on encapsulation efficiency) demonstrating that the encapsulation and washing method effectively sequesters the oils inside the yeast cells.

Moreover, while encapsulated CBO was ineffective against *Aedes* larvae, the formulation was quite effective against *Culex* larvae. In contrast, MO and OO encapsulated yeast microparticles successfully killed *A. aegypti* larvae in a dose dependent manner. Accordingly, specific EOs that have been encapsulated in a way that ensures no residual oil is present on the surface of the microparticles enables specific targeting of different species.

Moreover, while much of the present disclosures has been directed towards the use of essential oils as the larvicidal element, similar dose-dependent killing was observed with encapsulated R-limonene, γ-terpinene, and myrcene, the primary compounds of MO and OO. For the purposes of the present disclosure, the term "primary compound" is intended to mean the chemical constituents for each of the selected EOs at 5% or greater. Accordingly, the present disclosure includes the encapsulation of one or more essential oil primary compounds including, but not limited to, R-limonene, γ-terpinene, myrcene, eugenol, menthol, and menthone.

According to a specific embodiment of use, the larvicidal capsules of the present disclosure could be distributed via (1) an air-water displacement propulsion device to oviposition sites or (2) an auto-dissemination strategy using a cornstarch-based powdered distributed at nesting sites. The larvae then consume the larvicidal capsules and the yeast cell wall is broken down by enzymes in the gut of $3^{rd}$ and $4^{th}$ larval instars, which liberates the essential oil(s) from the capsule, allowing the oil to act on the larvae, resulting in larval death. In general, this system could be used in additional to or instead of existing municipal or rural larvicide/insecticide/other pest control programs. Furthermore, because the presently described system can be used in environments where traditional chemical larvicides and insecticides aren't used due to safety risks, the presently described larvicidal system can be used in high value breeding sites, including in drinking water reservoirs and the like. Alternatively, as described in greater detail below, the larvicidal capsule may be designed to piggyback on female mosquitos, who then carry the capsules back to oviposition sites.

Accordingly, the present disclosure provides methods for delivering or directing the larvicide towards or retaining the larvicide in specific desired environments. For example, because the larvicide targets larvae, it may be desirable to direct and maintain the larvicide to oviposition environments so as to ensure the larvae will have the opportunity to encounter and ingest the larvicide. According to some embodiments, this may involve modifying the larvicidal capsule.

For example, as stated above, the larvicidal capsule may be incorporated in a powder to piggyback on female mosquitos, who can then carry the capsules to known or unknown oviposition sites. For example, the *A. aegypti* mosquito tends to rest in dry, sheltered areas such as residential awnings and holes in trees, but also tend to visit many oviposition sites. Accordingly, rather than trying to place the larvicide at each oviposition site, it may be easier to place the larvicide in known resting sites or areas that look like likely resting sites. The larvicidal capsules of the present disclosure may be coated with silica, cornstarch or another pH ~7 soluble coating to produce a powder which can be spread at likely resting sites and which can then be picked up and delivered to oviposition sites by female mosquitos. Moreover, anatomical difference between male and gravid female mosquitoes could be exploited to improve targeting and transfer of the larvicide to the oviposition sites. For example, the soluble coating may be able to accommodate biofunctionalization for tuning adherence to and aquatic release from female mosquitoes. Soluble coatings may provide other advantages including increasing the effective lifespan of the larvicide and or increasing the speed and efficacy of distribution.

As another example of possible larvicidal capsule modifications, the larvicidal capsules of the present disclosure may be modified to achieve certain desired buoyancies. For example, mosquito larvae are known to have different feeding behaviors, i.e. some are surface feeders while others are benthic (bottom) feeders. In order to ensure that the larvicide reaches the different feeding populations, the present disclosure provides methods for producing capsules with different buoyancies, allowing the capsules to maintain different water levels, or to maintain the location of the capsules in, for example, moving or running water bodies.

According to an embodiment, the buoyancy of the capsule can be altered by introducing air pockets in the capsule. For example, when the ingestible delivery vehicle is a non-viable yeast cell, air pockets could be introduced into the yeast membranes during the encapsulation stage via oxygen infusion. In general, by controlling the volume of the air pocket in relationship to the density of the contents of the capsule, one can control the degree of buoyancy of the capsule, thereby producing a capsule that would float on the surface of the water or maintain a certain water depth.

Alternatively, or additionally, the buoyancy of the capsule can be altered by applying an adhesive element to the exterior of the ingestible delivery vehicle. The presence of an adhesive element promotes clumping and facilitates sinking of the capsules. Suitable adhesive elements may take the form, for example of muco-adhesive compounds such as doped alginates. These could be applied to the exterior of the capsules by painting, dipping, spraying, and immersion/vacuum drying.

Combinations of air pockets and adhesive elements could be used to even more precisely fine tune the capsule so that it can maintain a desired position within the water column. Additionally, buoyancy of the capsule may be altered by altering its essential oil loading capacity, e.g. through the use of plasmolyzers.

Alternative or additional modifications of the capsules include opsonization with phagostimulants, membrane saturation with chemoattractants, and combination in biodynamic configurations to facilitate larval feeding dynamics.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

EXAMPLES

I. Encapsulation of Essential Oil in *S. cerevisiae*

Orange oil was encapsulated into *S. cerevisae* in the following manner: Orange oil, fresh Baker's yeast and water are mixed at a ratio of 1:5:16 by weight into a baffled flask (Mixture 1).

Mixture 1 is agitated at 40° C. for a minimum of 4 hours.

Mixture 1 is transferred to vials and centrifuged for 10 minutes at 2000×g to recover cells.

After decanting cells are washed once with 20% Tween-20, followed by 3 washes in water to remove excess surfactant. Cells are centrifuged down between each wash.

The washed larvicide are aliquoted into tubes, frozen and lyophilized (freeze dried). Lyophilized samples are can be stored at −20° C. Larvicide aliquots are rehydrated before use.

Similar methods of encapsulation can be optimized for other essential oils.

II. Efficacy of Essential Oil Larvicide

Protocol

Third and fourth instar larvae are collected following a starvation period.

Experimental and control groups (25 larvae per group) allowed to accommodate to 100 ml-200 ml distilled water in enamel bowls for 1 hour.

Experimental group fed essential oil micro-encapsulations, four replicates per concentration.

Test containers are maintained at 25-28 C, with 12/12 light/dark environment preferred.

Mortality after 24 and 48 hours with no additional nutrition.

Determination of 50% and 90% mortality and inhibition of adult emergence concentrations.

Abbott's test: control vs. experimental mortality.

III. Characterization of Encapsulated Essential Oils

Extraction of EO from yeast—A "bead mill" method is used to recover the encapsulated EO from the yeast. Briefly, lyophilized encapsulated microparticles are combined with ethanol. Glass beads are added to the mixture, and vortex at maximal speed on a table top vortexer. The sample is centrifuged down, and ethanol supernatant recovered. This step is repeated once. This simple extraction procedure captures approximately 90% of total encapsulated oil.

Figure 2A:
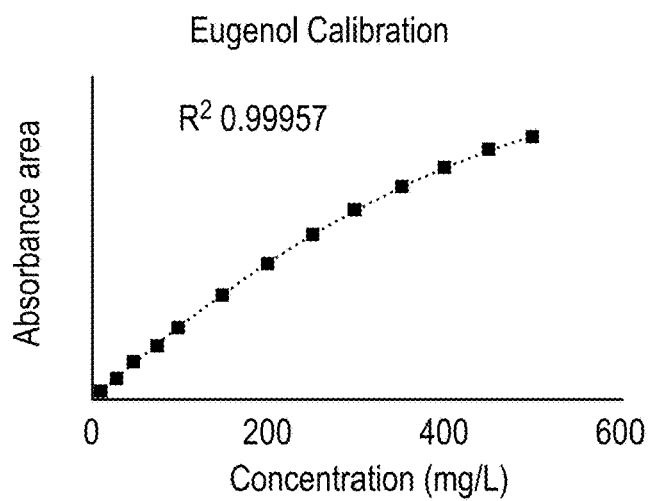
FIG. 2A shows the calibration curves for eugenol in CBO.
Figure 2B:
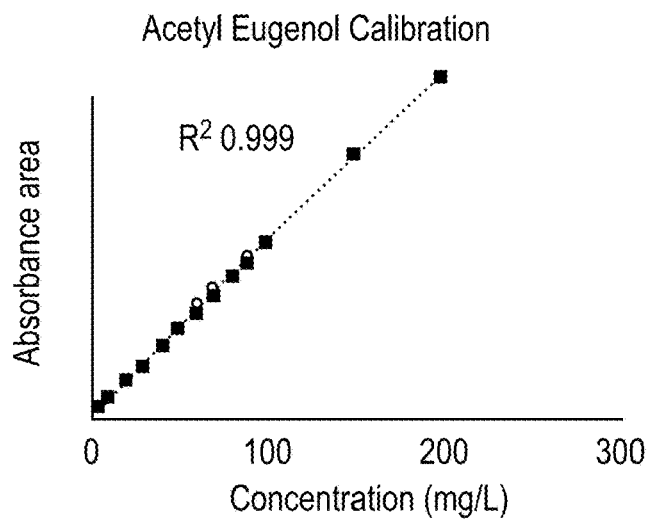
FIG. 2B shows the calibration curves for acetyl eugenol in CBO.

Quantitative analysis by HPLC: FIG. 1 depicts HPLC analysis of CBO. The 2 major components of CBO, eugenol and acetyl eugenol, resolves at 3.9 min and 6.6 min, respectively. Both peaks are well resolved, and the analysis has been repeatable across concentrations of one order of magnitude. The batches of CBO analyzed have been composed of ~90% eugenol and up to 10% acetyl eugenol. FIG. 2 shows the calibration curves for eugenol (A) and acetyl eugenol (B), the primary components of CBO. These curves are subsequently used to determine the concentration of each component extracted from the CBO encapsulated yeast cells.

Figure 3:
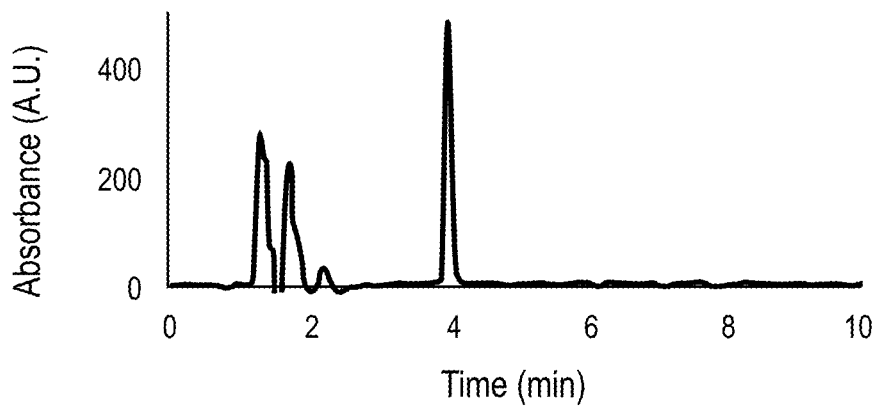
FIG. 3 is an HPLC chromatogram for a 4 hr encapsulation of CO.

An HPLC chromatogram for a 4 hr encapsulation of CO is shown in FIG. 3. The area under the eugenol peak at 4 mins is 2975, which corresponds to a concentration of 202 mg/L eugenol. The peaks between 1 and 2.3 minutes are from the solvent, Acetyl eugenol is below the detection limit in this batch of clove oil. This extraction was performed using 0.459 g cells into 2.0 mL of methanol. These results therefore suggest that there is approximately 1 mg of oil per gram of wet cells. In more recent studies with lyophilized CO-loaded yeast, the final loading was determined to be ~11% by weight.

Figure 4:
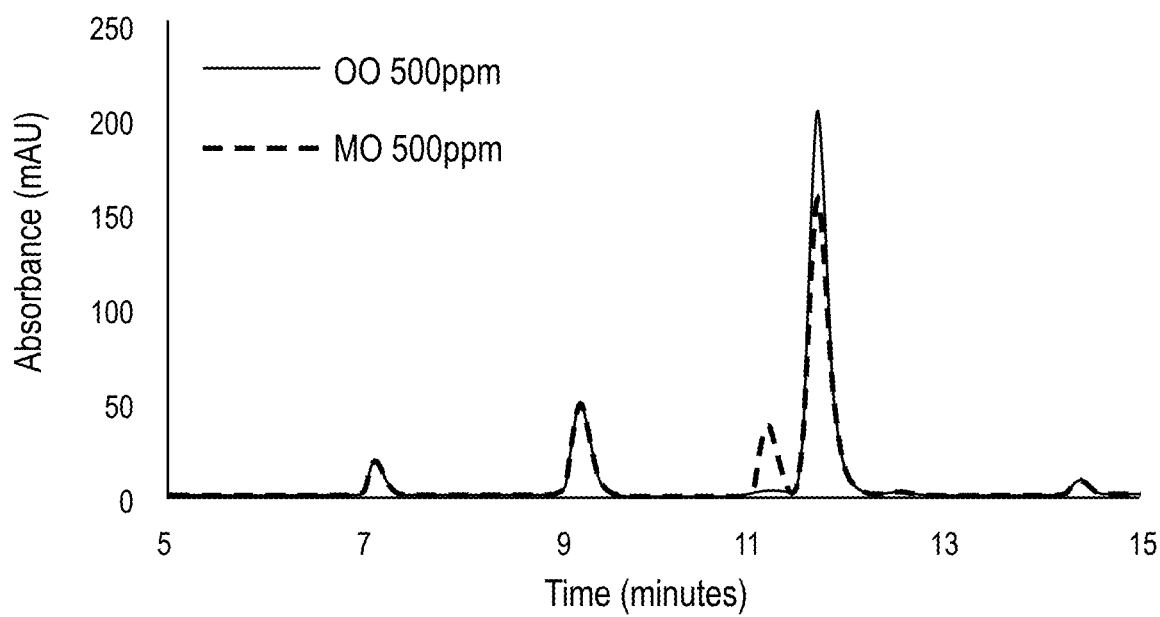
FIG. 4 is a graph showing the chromatograms of MO and CO.

Similar computations are used to compute encapsulation loading of MO and OO. This was determined to be between 30%-40% by weight. MO and OO are composed of similar primary components, as seen in FIG. 4. Peaks have been identified as: 9.3 minutes—myrcene; 11.2 minutes—γ-terpinene; 11.7 minutes—limonene. The minor components, at 7.1 min and 14.5 mins, include nobiletin, tangeretin, and didymin.

Figure 5:
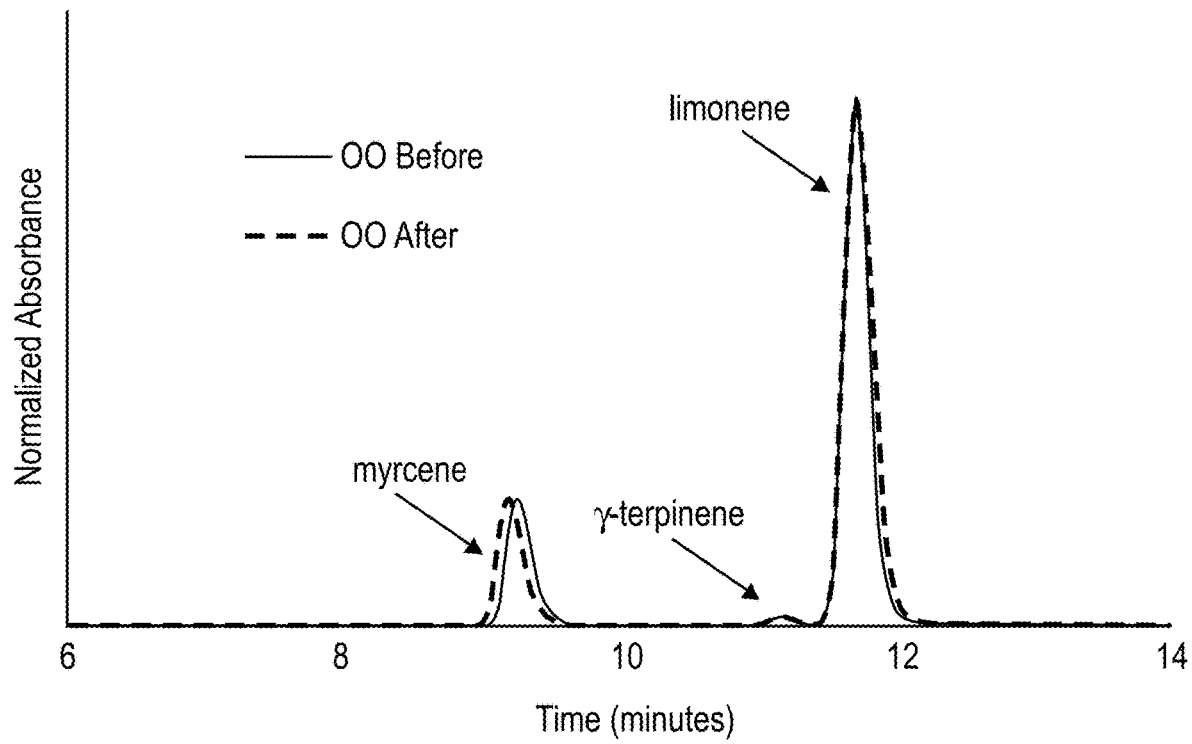
FIG. 5 is a chromatogram of OO (solid line) compared to OO extracted (dashed line) from OO encapsulated yeast microparticles.

FIG. 5 is a chromatogram of OO (solid line) compared to OO extracted (dashed line) from OO encapsulated yeast microparticles and demonstrates that there is no significant change to the primary components of the OO following encapsulation and extraction from yeast cells.

Figure 6:
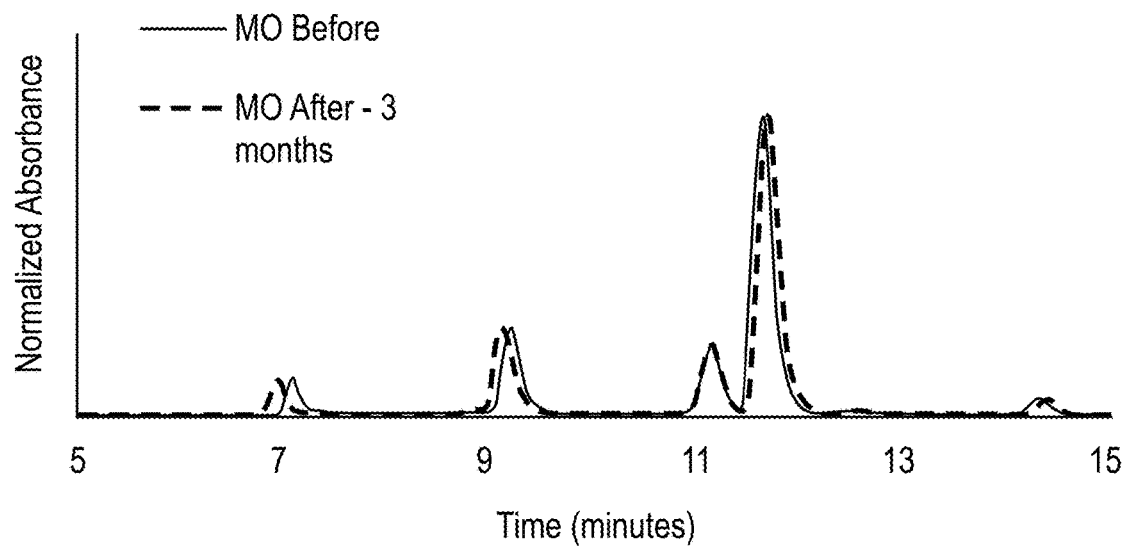
FIG. 6 is a chromatogram of MO (solid line) compared to MO extracted (dashed line) from MO encapsulated microparticles that were stored at 4° C. for 3 months.

FIG. 6 is a chromatogram of MO (solid line) compared to MO extracted (dashed line) from MO encapsulated microparticles that were stored at 4° C. for 3 months.

Table 1 shows the compositions of un-encapsulated MO and OO compared to MO and OO extracted from either MO or OO encapsulated microparticles. There is no significant change in EO composition after encapsulation.

|  | Myrcene (wt %) | γ-terpinene (wt %) | Limonene (wt %) | Minor components |
|---|---|---|---|---|
| Mandarin orange oil (MO) | 2.2% | 16.6% | 73.0% | 8.2% |
| Sweet orange oil (O) | 2.4% | 1.6% | 89.6% | 6.4% |
| MO extracted from encapsulated yeast microparticles (% change) | No change | No change | No change | N/A |
| OO extracted from encapsulated yeast microparticles (% change) | −0.2% | +0.1% | +0.1% | N/A |

IV. Larvicidal Trials of Clove Bud Oil (CBO) Mandarin Orange Oil (MO) and Sweet Orange Oil (OO) Against *A. aegypti* and Non-Target Species Larvicide trials were performed using *Aedes aegypti* L3/L4 larvae. Briefly, 100 larvae were used for each treatment. Insects were divided into 4 cups of 25 larvae each in 100 mL of water. Test concentrations of EO-encapsulated yeast cells were added to respective cups, and larvae were monitored daily for 4 days. Control larvae were fed inactivated (non-encapsulated) yeast cells at the highest concentration.

Figure 7:
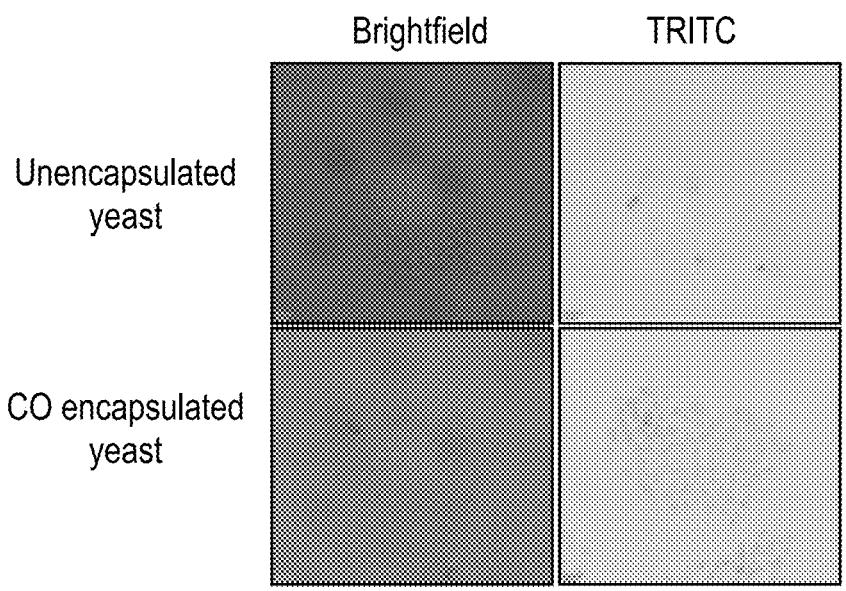
FIG. 7 shows dose dependent killing of *A. aegypti* L3/L4 larvae by MO encapsulated microparticles.

FIG. 7 shows dose dependent killing of *A. aegypti* L3/L4 larvae by MO encapsulated microparticles. Similar results were seen with OO encapsulated microparticles.

Figure 8A:
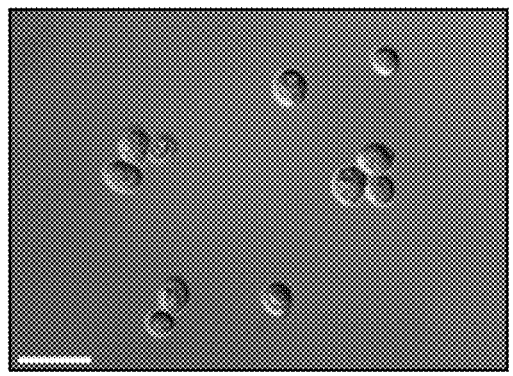
FIG. 8A is a micrograph of cells with encapsulated OO.
Figure 8B:
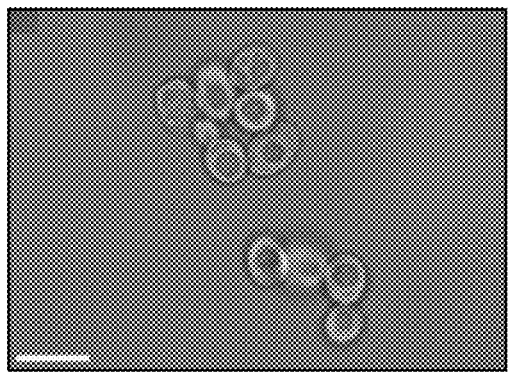
FIG. 8B is a micrograph of cells without OO.
Figure 8C:
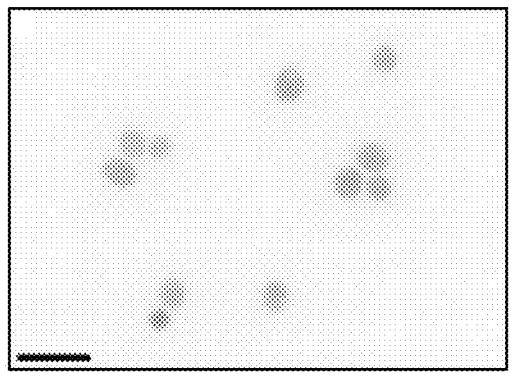
FIG. 8C shows the fluorescence of cells with encapsulated OO using a TRITC filter.
Figure 9A:
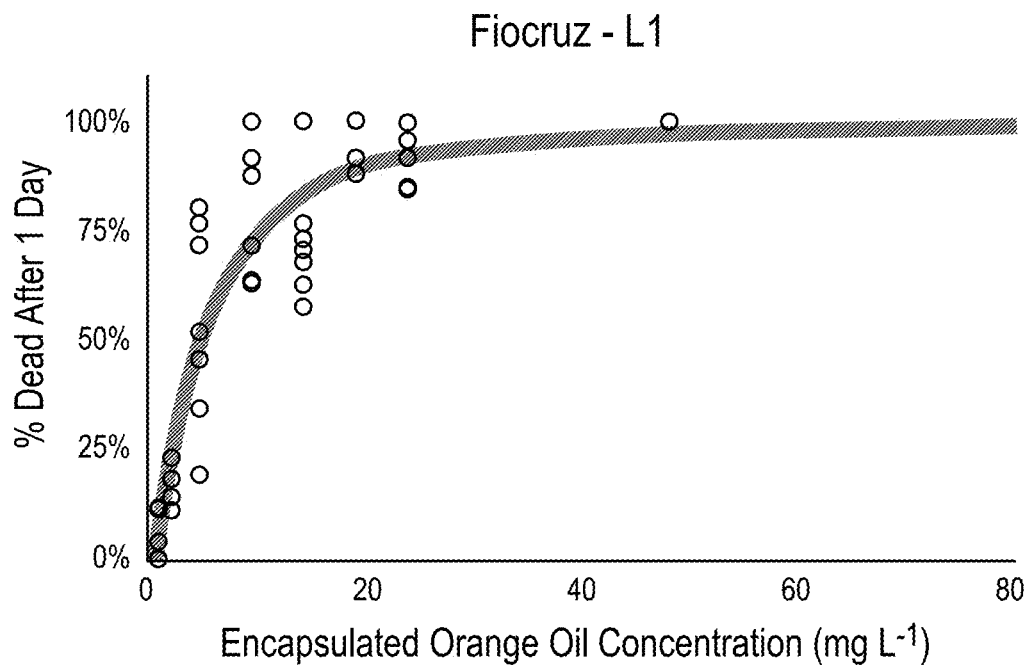
FIG. 9A is a mortality curve for *Ae. aegypti* larvae using larvae at the $1^{st}$ instar stage.
Figure 9B:
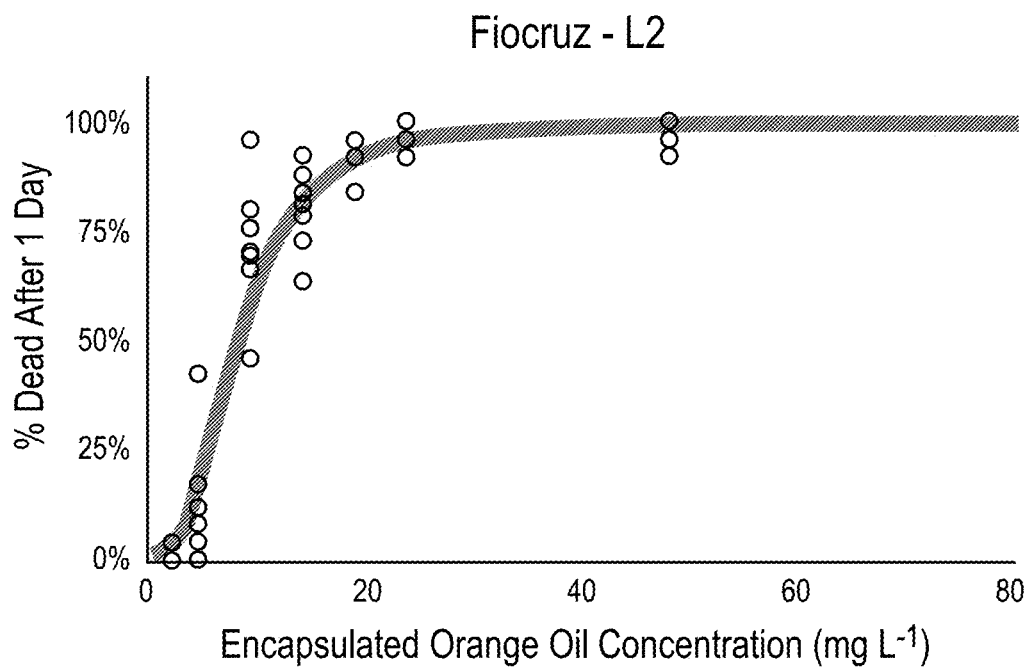
FIG. 9B is a mortality curve for *Ae. aegypti* larvae using larvae at the $2^{nd}$ instar stage.
Figure 9C:
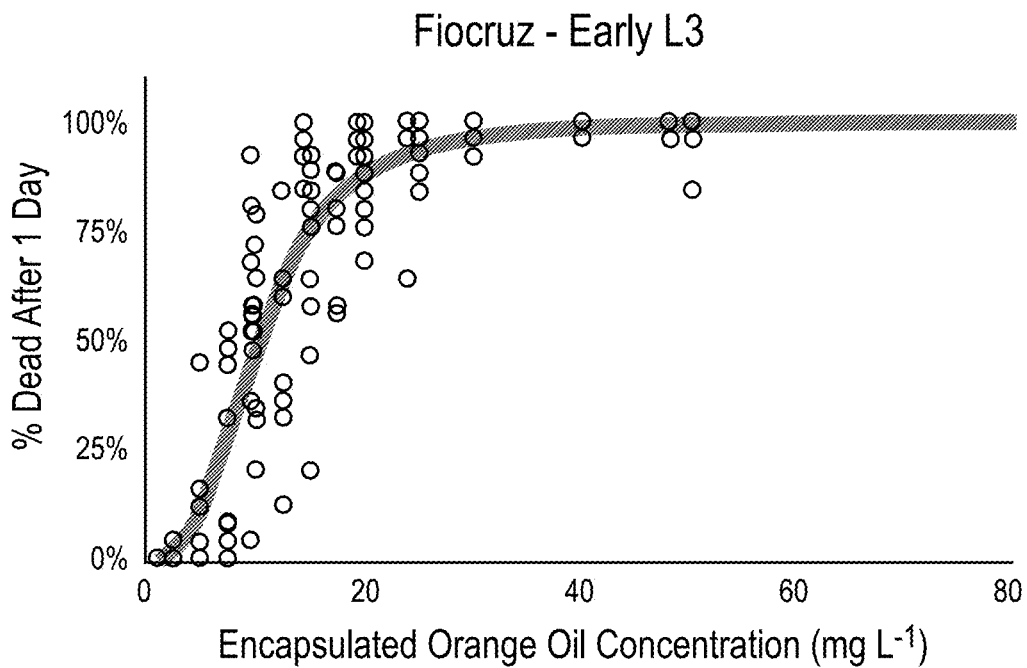
FIG. 9C is a mortality curve for *Ae. aegypti* larvae using larvae at the early $3^{rd}$ instar stage.
Figure 9D:
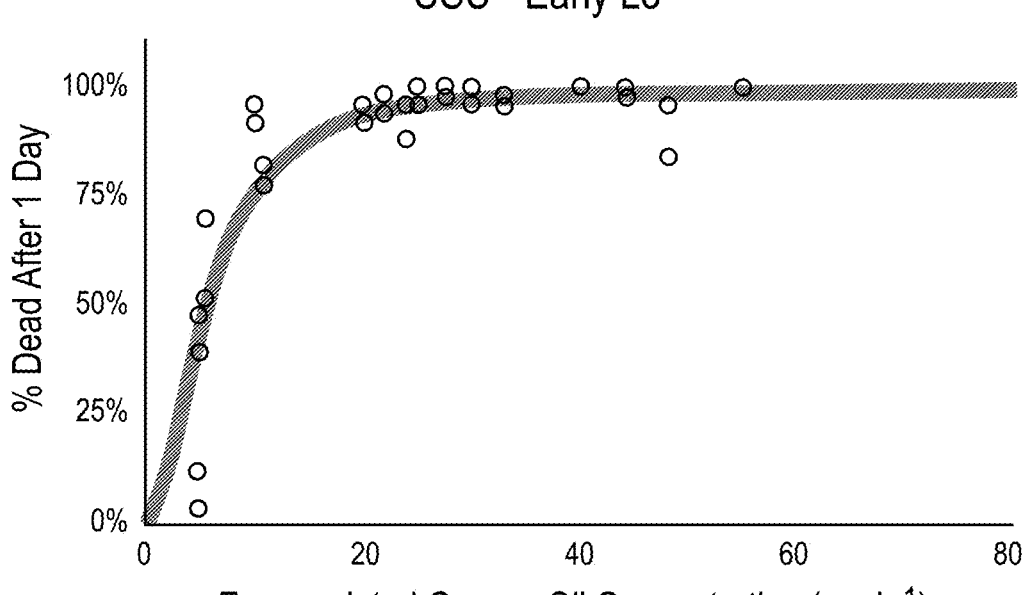
FIG. 9D is another mortality curve for *Ae. aegypti* larvae using larvae at the early $3^{rd}$ instar stage.
Figure 9E:
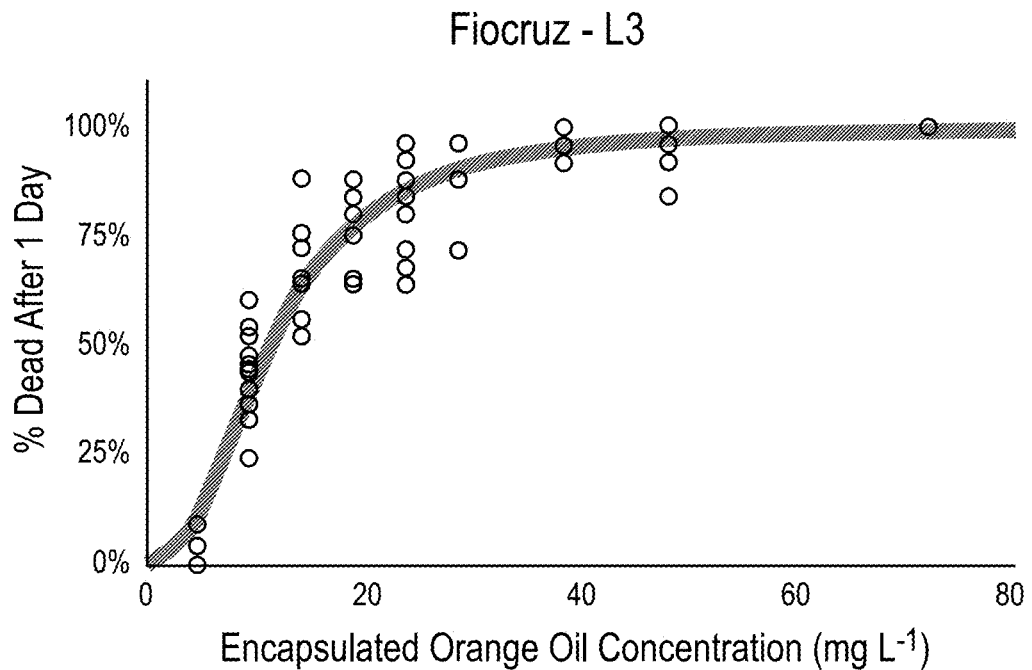
FIG. 9E is a mortality curve for *Ae. aegypti* larvae using larvae at the $3^{rd}$ instar stage.
Figure 9F:
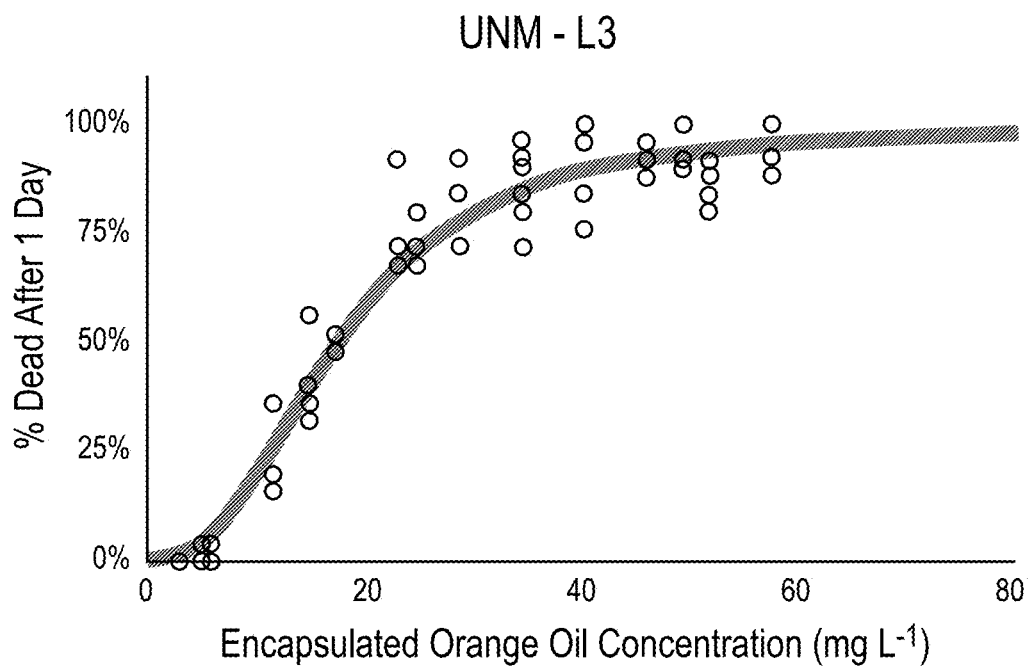
FIG. 9F is another mortality curve for *Ae. aegypti* larvae using larvae at the $3^{rd}$ instar stage.
Figure 9G:
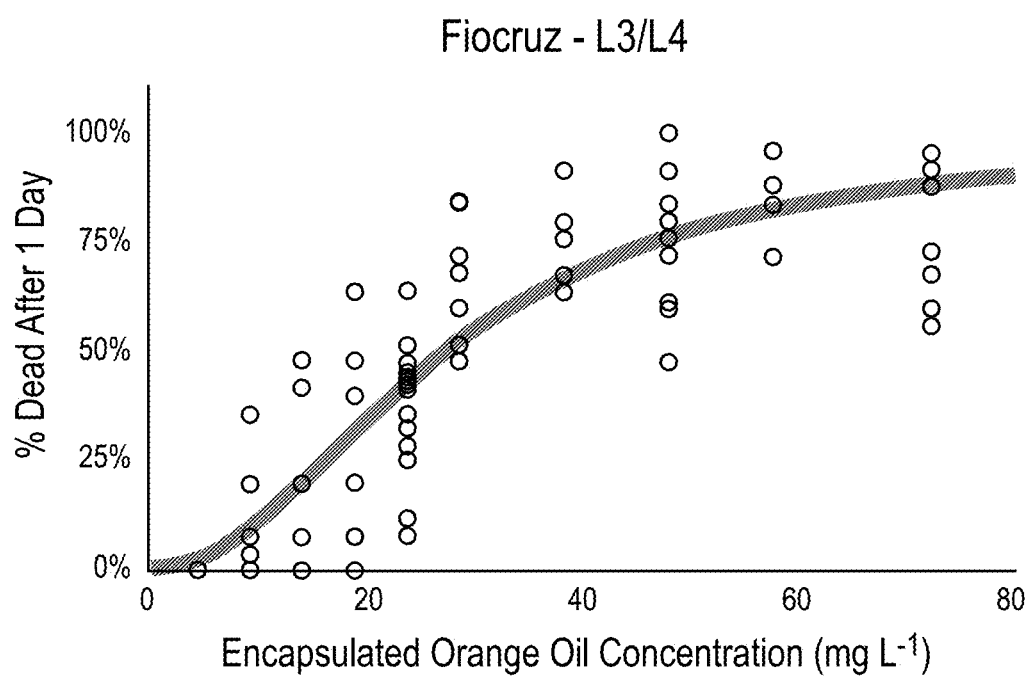
FIG. 9G is a mortality curve for *Ae. aegypti* larvae using larvae at the late $3^{rd}$/early $4^{th}$ instar stage.

FIGS. 8A-8C are micrographs of cells with and without encapsulated OO. FIGS. 8A and 8B are DIC images of cells with and without oil, respectively. FIG. 8C is fluorescence of cells with oil using the TRITC filter. Cells without oil exhibited no visible fluorescence under these imaging conditions (not shown). Scale bars are 10 μm.

FIGS. 9A-9G are mortality curves for *Ae. aegypti* larvae. Each point represents one cup with 25 larvae. Efficacy of larvicide was tested at three sites, (identified as UNM, USU and Fiocruz) using larvae at $1^{st}$ (L1), $2^{nd}$ (L2), early $3^{rd}$ (early L3) and late $3^{rd}$/early $4^{th}$ (L3/L4) instar stages. Graphs show larvae mortality following 24 hours of exposure.

What is claimed is:

1. A larvicidal capsule comprising an essential oil encapsulated in a non-viable intact ingestible yeast cell delivery vehicle, wherein said essential oil is selected from the group consisting of mandarin orange oil, sweet orange oil, clove bud oil, primary compounds thereof or a mixture thereof, wherein the capsule does not contain any essential oil, primary compounds thereof and does not have a soluble silica coating on the external surface, and wherein the yeast cell delivery vehicle sequesters the oil from a surrounding environment until the yeast cell delivery vehicle is ingested by larvae of the pest insect.

2. The larvicidal capsule of claim 1 wherein said essential oil is mandarin orange oil.

3. The larvicidal capsule of claim 1 wherein said essential oil is sweet orange oil.

4. The larvicidal capsule of claim 1 wherein said essential oil is clove bud oil.

5. The larvicidal capsule of claim 1 further comprising a buoyancy control mechanism.

6. The larvicidal capsule of claim 5 wherein the buoyancy control mechanism comprises an air pocket within the non-viable yeast cell.

7. The larvicidal capsule of claim 6 wherein the air pocket maintains the larvicidal capsule on the surface of the body of water.

8. The larvicidal capsule of claim 6 wherein the air pocket maintains the larvicidal capsule below the surface of the body of water but above the bottom of the body of water.

9. The larvicidal capsule of claim 1 further comprising an adhesive element that facilitates clumping of multiple larvicidal capsules.

10. The larvicidal capsule of claim 9 wherein the adhesive element is applied to the exterior of the ingestible delivery vehicle.

11. The larvicidal capsule of claim 5 further comprising an adhesive element that facilitates clumping of multiple larvicidal capsules.

12. A composition comprising a population of larvicide capsules according to claim 1.

13. A method for controlling a target pest population comprising;
    introducing to the target pest population the larvicidal capsule of claim 1 under suitable conditions such that it is likely that larvae of said target pest population will ingest the larvicidal capsule.

14. The method of claim 13 wherein said introducing comprises positioning a powder comprising the larvicidal capsules in an area wherein gravid adult female target pests are likely to congregate, wherein the powder adheres to the gravid female such that it is carried to oviposition sites.

15. A method for forming a larvicidal capsule comprising encapsulating an essential oil within a non-viable ingestible intact yeast cell delivery vehicle, wherein said essential oil is selected from the group consisting of mandarin orange oil, sweet orange oil, clove bud oil, primary compounds thereof or a mixture thereof and washing said delivery vehicle with a surfactant after encapsulation to remove essential oil and primary compounds thereof from the surface of said capsule, wherein the capsule does not have a soluble silica coating, and wherein the yeast cell delivery vehicle sequesters the oil from a surrounding environment until the yeast cell delivery vehicle is ingested by larvae of the pest insect.

16. The method of claim 15 further comprising introducing a buoyancy control mechanism into the larvicidal capsule.

\* \* \* \* \*

UNITED STATES PATENT AND TRADEMARK OFFICE
CERTIFICATE OF CORRECTION

| | |
|---|---|
| PATENT NO. | : 11,337,422 B2 |
| APPLICATION NO. | : 16/520847 |
| DATED | : May 24, 2022 |
| INVENTOR(S) | : Ivy Foo-Hurwitz et al. |

It is certified that error appears in the above-identified patent and that said Letters Patent is hereby corrected as shown below:

In the Specification

Column 1, after Line 16. Insert the following:
--GOVERNMENT SUPPORT
This invention was made with government support under grant contract no. 200-2017-93140 awarded by the Centers for Disease Control and Prevention. The government has certain rights in the invention.--

Signed and Sealed this
First Day of October, 2024

*Katherine Kelly Vidal*

Katherine Kelly Vidal
*Director of the United States Patent and Trademark Office*